United States Patent
Sugaya et al.

(10) Patent No.: US 6,471,867 B2
(45) Date of Patent: Oct. 29, 2002

(54) ELECTRO-REGENERATING TYPE APPARATUS FOR PRODUCING DEIONIZED WATER

(75) Inventors: Yoshio Sugaya, Kanagawa (JP); Yukio Matsumura, Chiba (JP); Hiroshi Toda, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/731,792

(22) Filed: Dec. 8, 2000

(65) Prior Publication Data

US 2001/0003329 A1 Jun. 14, 2001

(30) Foreign Application Priority Data

Dec. 10, 1999 (JP) ............................................ 11-351946

(51) Int. Cl.[7] .............................. B01D 17/06; C02F 1/42
(52) U.S. Cl. ...................... 210/644; 204/524; 204/533; 204/632; 204/634; 210/669; 210/748; 210/243; 210/266; 210/264; 210/283
(58) Field of Search ................................. 210/243, 264, 210/266, 283, 638, 660, 748, 669; 204/524, 536, 551, 632, 633, 634, 636

(56) References Cited

U.S. PATENT DOCUMENTS

| | | | |
|---|---|---|---|
| 2,981,671 A | | 4/1961 | Griffiths |
| 3,755,134 A | * | 8/1973 | Francis et al. ............... 204/634 |
| 5,759,373 A | * | 6/1998 | Terada et al. ................ 204/634 |
| 5,837,124 A | * | 11/1998 | Su et al. ..................... 204/634 |
| 5,944,972 A | | 8/1999 | Toda et al. .................. 204/536 |
| 6,071,397 A | | 6/2000 | Terada et al. ............... 204/632 |
| 6,149,788 A | | 11/2000 | Tessier et al. .............. 204/524 |
| 6,241,866 B1 | * | 6/2001 | Mir ............................. 204/634 |

FOREIGN PATENT DOCUMENTS

| | | |
|---|---|---|
| EP | 0 170 895 | 2/1986 |
| EP | 0 839 762 | 5/1998 |

OTHER PUBLICATIONS

Patent Abstracts of Japan, vol. 1999, No. 12, Oct. 29, 1999, JP 11 179369, Jul. 6, 1999.
Patent Abstracts of Japan, vol. 1996, No. 11, Nov. 29, 1996, JP 08 182991, Jul. 16, 1996.

* cited by examiner

*Primary Examiner*—Joseph W. Drodge
(74) *Attorney, Agent, or Firm*—Oblon, Spivak, McClelland, Maier & Neustadt, P.C.

(57) ABSTRACT

An electro-regenerating type apparatus for producing deionized water, which comprises an electrodialyzer having cation exchange membranes and anion exchange membranes alternately arranged between an anode compartment provided with an anode and a cathode compartment provided with a cathode, demineralizing compartments compartmentalized with the anion exchange membranes on the anode side and compartmentalized with the cation exchange membranes on the cathode side, and concentrating compartments compartmentalized with the cation exchange membranes on the anode side and compartmentalized with the anion exchange membranes on the cathode side, the electrodialyzer having ion exchangers accommodated in the demineralizing compartments, wherein a porous anion exchanger layer having a porosity of from 20 to 95%, a maximum pore size of from 0.01 to 500 $\mu$m and a thickness of at least five times the maximum pore size and from 10 $\mu$m to 10 mm, is provided on the anode side of each anion exchange membrane.

16 Claims, No Drawings

ELECTRO-REGENERATING TYPE APPARATUS FOR PRODUCING DEIONIZED WATER

BACKGROUND OF THE INVENTION

The present invention relates to an apparatus for producing deionized water by electro-regenerating deionization (hereinafter referred to as EDI) method. More particularly, it relates to an apparatus for efficiently producing pure water or highly deionized water which is called e.g. ultra-pure water, which is used for manufacturing industries such as pharmaceutical-manufacturing industries, semiconductor-manufacturing industries and food industries, or boiler water and other laboratory facilities.

Heretofore, as a method for producing deionized water, it is common to obtain deionized water by passing water to be treated through a bed packed with an ion exchange resin so that impurity ions are removed as adsorbed on the ion exchange resin. Here, the ion exchange resin having its ion-exchanging and adsorbing abilities lowered has to be regenerated, and the regeneration is carried out usually by using an acid or an alkali. However, this method has problems such as troublesome operation for regenerating the ion exchange resin, and discharge of a waste liquid due to the acid or alkali used for the regeneration.

Therefore, a method for producing deionized water which requires no such regeneration is desired. From such a viewpoint, an EDI method which requires no regeneration operation by a chemical reagent such as an acid or an alkali has been recently developed and practically used. This method employs an electrodialyzer having anion exchange membranes and cation exchange membranes alternately arranged to form demineralizing compartments and having a mixture of an anion exchange resin and a cation exchange resin accommodated in the demineralizing compartments, and is designed to apply a voltage while supplying water to be treated to the demineralizing compartments and supplying concentrating water to concentrating compartments arranged alternately to the demineralizing compartments to carry out electrodialysis to produce deionized water and at the same time, to carry out regeneration of the ion exchange resin. Accordingly, with said method, no additional regeneration of the ion exchange resin has to be carried out.

Thus, a conventional EDI method employs an apparatus for producing deionized water which comprises an electrodialyzer having cation exchange membranes and anion exchange membranes alternately arranged between an anode compartment provided with an anode and a cathode compartment provided with a cathode, demineralizing compartments compartmentalized with the anion exchange membranes on the anode side and compartmentalized with the cation exchange membranes on the cathode side, and concentrating compartments compartmentalized with the cation exchange membranes on the anode side and compartmentalized with the anion exchange membranes on the cathode side, the electrodialyzer having an anion exchange resin and a cation exchange resin accommodated in the demineralizing compartments, and impurity ions in water to be treated are removed by applying a voltage while supplying the water to be treated to the demineralizing compartments and supplying a part of the water to be treated or already treated water as a concentrating water to the concentrating compartments.

According to this method, as mentioned above, the ion exchange resins are continuously regenerated simultaneously, and it therefore has an advantage that regeneration by a chemical reagent such as an acid or an alkali is not necessary, and a treatment of a waste liquid to be generated by the regeneration is not necessary. However, there is a problem with the EDI apparatus that the electric resistance gradually increases due to hardness components in the water to be treated such as calcium ions, magnesium ions and the like, thus leading to increase in the applying voltage or decrease in electric current, and further, the resistivity of the treated water to be produced tends to decrease due to decrease in the demineralization performances.

Many methods have already been proposed to overcome such problems, and examples of which include a method of preliminarily subjecting water to be supplied for an EDI apparatus to a reverse osmosis membrane treatment in two steps to remove hardness components as much as possible and then supplying said water as, the water to be treated by the EDI method (JP-A-2-40220) and a method of subjecting water to electrolysis in an acid water-forming electrolyzer which is prepared separately, and passing the acid water produced in an anode compartment through the concentrating compartments of the EDI method (JP-A-10-128338). By employing such methods, long-term performance of the EDI method may be stabilized, but the investment cost tends to increase, and as a result, the advantages of the EDI system as compared with other deionization methods tend to diminish.

Further, a method of intermittently making the water to be treated, to be supplied to the demineralizing compartments, acescent in order that the ion components strongly adsorbed on an ion exchange resin in the demineralizing compartments are intermittently dissolved, has been proposed (JP-A-3-26390), but there is a problem such that the resistivity of the treated water tends to decrease during the intermittent treatment. Further, a method in which a liquid having an aqueous solution of a hydrochloride or sulfate of an alkali metal added thereto so that the electrical conductance becomes from 100 to 800 $\mu$S/cm, is supplied to the concentrating compartments in the EDI method to stabilize the electric current in the EDI method to obtain a treated water having a high purity, has been proposed (JP-A-9-24374), but the long-term stability in the performance is not clarified.

The present invention relates to an apparatus to overcome the above problems of the conventional system for producing deionized water by EDI and the improved method for producing deionized water having long-term stability which has been proposed later. Namely, it is an object of the present invention to provide a novel EDI demineralization system which prevents and overcomes decrease in performance due to impurities such as hardness components in the water to be treated, to be supplied in the EDI method.

SUMMARY OF THE INVENTION

The above object will be explained in further detail. In the conventional apparatus for producing deionized water by EDI method, as the concentrating water is recycled, the hardness components are concentrated in the concentrating compartments as operation time passes, and the hardness components (calcium and magnesium ions) are bonded to OH ions or carbonate ions transferred from the demineralizing compartments through the anion exchange membranes and are deposited and accumulated as hydroxides or carbonates to increase the electric resistance, and a good ion exchange state may thereby be impaired.

Studies by the present inventors clarified the following. Cation such as Na ions, Ca ions and Mg ions in a concentrating compartment is distributed in large part in the vicinity of the anion exchange membrane due to potential gradient. On the other hand, OH ions generated by dissociation of water in a demineralizing compartment are transmitted through the anion exchange membrane and reach the concentrating compartment, and accordingly, OH ions of high concentration are present in the vicinity of the anion exchange membrane. As a result, on the surface and in the vicinity of the anion exchange membrane on the concentrating compartment side, hardness components such as Ca ions and Mg ions, and OH ions or carbonate ions are bonded, and hydroxides or carbonates are deposited.

The present invention has been made on the basis of the above-mentioned results of studies and facts clarified, and it is an object of the present invention to provide an apparatus for producing deionized water by EDI method which is stabilized for a long period of time, wherein deposition and accumulation of hardness components on the surface of the anion exchange membranes on the concentrating compartment side are prevented to suppress increase in the electric resistance of the EDI apparatus, and the purity of the deionized water produced is not decreased.

The present invention resides in an apparatus for producing deionized water to overcome the above object, and it can be achieved by an electro-regenerating type method for producing deionized water, which comprises using an apparatus for producing deionized water comprising an electrodialyzer having cation exchange membranes and anion exchange membranes alternately arranged between an anode compartment provided with an anode and a cathode compartment provided with a cathode, demineralizing compartments compartmentalized with the anion exchange membranes on the anode side and compartmentalized with the cation exchange membranes on the cathode side, and concentrating compartments compartmentalized with the cation exchange membranes on the anode side and compartmentalized with the anion exchange membranes on the cathode side, the electrodialyzer having ion exchangers accommodated in the demineralizing compartments; and applying a voltage while supplying water to be treated to the demineralizing compartments to remove impurity ions in the water to be treated, wherein a porous anion exchanger layer having a porosity of from 20 to 95%, a maximum pore size of from 0.01 to 500 $\mu$m and a thickness of at least five times the maximum pore size and from 10 $\mu$m to 10 mm, is provided on the anode side of each anion exchange membrane.

Accordingly, in the present invention, by employing the above means, particularly by disposing a porous anion exchanger layer on the anode side of each anion exchange membrane, deposition and accumulation of hardness components on the surface and in the vicinity of the anion exchange membrane on the concentrating compartment side can be prevented, whereby increase in voltage can be suppressed even when an EDI apparatus for producing deionized water is operated for a long period of time, and there is no decrease in resistivity of the deionized water produced as well.

The reason why or the mechanism how deposition and accumulation of the hardness components can be prevented and increase in the electric resistance due to the hardness components can be suppressed, and the resistivity of the deionized water produced will not decrease and decrease in deionization performance can be suppressed as well, by disposing a porous anion exchanger layer on the anode side of each anion exchange membrane, is not adequately clarified. However, the present inventors estimate as follows at the present stage.

As mentioned above, in a conventional EDI apparatus, the OH ion concentration is high and the calcium ion or magnesium ion concentration is also increased due to potential gradient on the surface of the anion exchange membrane on the anode side, whereas in the present invention, a porous anion exchanger layer is provided on the anode side of each anion exchange membrane, whereby diffusion and dilution of OH ions in the concentrating liquid are accelerated by the porous surface, and the OH ion concentration on the surface of said membrane will be quickly reduced. On the other hand, the hardness component ions are hardly infiltrated into the porous anion exchanger layer, and the chance that OH ions and hardness component ions are in contact and reacted with each other will decrease. The present inventors estimate that deposition and accumulation of the hardness components on the surface of the anion exchange membranes on the anode side are suppressed, and the electric resistance and deionization performance are stabilized accordingly.

DETAILED DESCRIPTION OF PREFERRED EMBODIMENTS

Now, the present invention will be described in detail with reference to the preferred embodiments.

With respect to the state how the porous anion exchanger layer having a porosity of from 20 to 95%, a maximum pore size of from 0.01 to 500 $\mu$m and a thickness of at least five times the maximum pore size and from 10 $\mu$m to 10 mm is provided on the anode side of the anion exchange membrane, they may be combined with each other, or they may be separately produced and disposed closely without being combined. The following three means may be mentioned by a rough classification by e.g. difference in production process. A first means is to form a porous anion exchanger layer having a porosity of from 20 to 95%, maximum pore size of from 0.01 to 500 $\mu$m and a thickness of at least five times the maximum pore size and from 10 $\mu$m to 10 mm on at least one side of the anion exchange membrane when it is prepared.

Specific examples of the first means include a method in which in a cast membrane forming from an anion exchange polymer solution, the anion exchange membrane is dipped in a bad solvent in such a state that a solvent remains on one side to form a porous layer, a method of imbedding fine soluble particles in one side when a thermoplastic anion exchange polymer or its precursor is formed into a membrane, followed by dissolution, and a method in which when a solution of an anion exchange group-containing monomer or its precursor is polymerized into a membrane, one side is coated with a monomer solution having a bad solvent to the polymer or fine soluble particles added thereto, followed by polymerization.

A second means is to separately prepare a porous anion exchanger layer and an anion exchange membrane, and to closely dispose them so that they are overlaid one on the other when they are composed into an electro-generating type deionization apparatus, without preliminarily combining them. A third means is to separately prepare a porous anion exchanger layer or its precursor and an anion exchange membrane or its precursor, and then to overlay one on the other so that they are laminated and combined. The second and third means are particularly preferred since various materials for the porous anion exchanger layer may be used.

As the anion exchange membrane to be used for the present invention, various ones may be used without particular limitation, and examples of which include an anion exchange membrane obtained by chloromethylation of a styrene-divinylbenzene polymerized membrane, followed by amination, a vinylpyridine-divinylbenzene type anion exchange membrane, a cast membrane from a chloromethylated-aminated polymer solution of polysulfone type, a heterogeneous ion exchange membrane formed from a mixture of a powder of an anion exchange resin with a thermoplastic binder or a binder solution, an anion exchange membrane obtained by graft polymerization of a monomer which can be converted to anion exchange groups into a polypropylene film or a fluorine-containing polymer film, and a perfluoro type anion exchange membrane.

Now, the porous anion exchanger layer to be provided on the anode side of the anion exchange membrane will be explained below. The porosity of the porous anion exchanger layer in the present invention is represented by difference between the apparent density of the anion exchanger layer dried to have a water content of 0% and the true density of the constituting material of the anion exchanger layer, on percentage of the true density.

Of the porous anion exchanger layer, if the porosity is at most 20%, the effect of diffusion and dilution of the OH ions is small, and if it is at least 95%, the mechanical strength of the porous anion exchanger layer may decrease, whereby the porosity may be impaired at the time of use, and the effect of diffusion and dilution may decrease. Accordingly, the porosity is from 20 to 95%, preferably from 25 to 90%, particularly preferably from 30 to 85%.

With respect to the maximum pore size of the porous anion exchanger layer having a porosity of from 20 to 95%, the effect of diffusion and dilution of the OH ions tends to be inadequate if it is small, and the hardness components in the concentrating liquid are likely to infiltrate into the inside of the porous layer if it is large. Accordingly, it is required to be from 0.01 to 500 $\mu$m, preferably from 0.1 to 300 $\mu$m. Here, the maximum pore size in the present invention is obtained by a bubble point method as disclosed in ASTM F-316.

If the porous anion exchanger layer is thin, the hardness components in the concentrating liquid are likely to infiltrate through the porous layer and reach the surface of the anion exchange membrane, and if it is too thick, the electric resistance of the anion exchanger layer tends to increase. Accordingly, the thickness of the porous anion exchanger layer is at least five times, preferably from 10 to 500 times, particularly preferably from 20 to 100 times, the maximum pore size of the porous layer. Further, it is from 10 $\mu$m to 10 mm, preferably from 20 $\mu$m to 8 mm, particularly preferably from 40 $\mu$m to 5 mm.

Further, as the porous anion exchanger layer to be provided on the anode side of the anion exchange membrane, preferred is fine porous membrane having a maximum pore size of from 0.01 to 10 $\mu$m provided with anion exchange functional groups. The material and method for producing the porous anion exchanger layer will be explained more specifically. A preferred method is such that to a microporous membrane having a maximum pore size of from 0.01 to 10 $\mu$m and a thickness of from 10 $\mu$m to 10 mm, e.g. a microporous membrane of an olefin type such as polyethylene or polypropylene or a fluorine-containing resin type such as polytetrafluoroethylene, a solution of anion exchange groups or a monomer or polymer which can be converted to anion exchange groups, is applied in such an extent that the porosity is not impaired, followed by polymerization, drying and the like to fix the anion exchange groups on the wall of the microporous membrane. Here, as the microporous membrane, preferred is one having a maximum pore size of from 0.01 to 10 $\mu$m, and the thickness of the microporous membrane is preferably from 10 $\mu$m to 10 mm.

As the above method, the following three patterns may be mentioned.

(1) A method of fixing anion exchange groups or a monomer which can be converted to anion exchange groups such as ethyleneimine, vinyl amine, vinyl pyridine, allylamine or chloromethyl styrene, to the wall of the porous membrane by e.g. radical polymerization or radiation polymerization.

(2) A method of applying a water-soluble polymer containing polyethyleneimine, polyallylamine, polyamidine, a hexamethylenediamine-epichlorohydrine polycondensation product, a dicyandiamide-formalin polycondensation product, a guanidine-formalin polycondensation product, polyvinylbenzyltrimethylammonium chloride, poly(4-vinylpyridine), poly(2-vinylpyridine), poly(2-dimethylaminoethylacrylate), poly(2-dimethylaminoethylmethacrylate), poly(l-vinylimidazole), poly(2-vinylpyradine), poly(4-butenylpyridine), poly(N,N-dimethylacrylamide), poly(N,N-dimethylaminopropylacrylamide) or a salt thereof, to the wall of the porous membrane, followed by reaction with formalin, epichlorohydrin or an alkylenedihalide by utilizing a heat treatment or active hydrogen bonded to the reaction site in the polymer, such-as nitrogen atoms, for insolubilization.

(3) A method of applying an organic solvent solution of a copolymer containing units of the above water soluble cation polymer and insoluble in water, or an organic solvent solution of a aminated polysulfone type polymer, to the wall of the porous membrane, followed by heat treatment for fixation.

Further, another preferred porous anion exchanger layer, a molded product which comprises 100 parts by mass of an anion exchange resin having a particle size of from 1 $\mu$m to 1,000 $\mu$m and from 1 to 20 parts by mass of a binder, and which has a maximum pore size of from 0.5 to 500 $\mu$m, may be mentioned. As a method for forming said porous anion exchanger layer, a method of kneading and molding 100 parts by mass of an anion exchange resin having a particle size of from 1 $\mu$m to 1,000 $\mu$m and from 1 to 20 parts by mass of a binder, and a soluble fine powder or a soluble molding aid as the case requires, into a molded product having a porosity of from 20 to 80% and a thickness of from 100 $\mu$m to 10 mm. In the above method, the amount of the binder is preferably from 1 to 10 parts by mass. It is particularly preferred to use an anion exchange resin which is porous itself, i.e. a so-called porous type or high porous type anion exchange resin, whereby an anion exchanger layer having a high porosity will be obtained.

Further, an aggregate of anion exchange fibers having an average size (average thickness) of from 1 to 100 $\mu$m accumulated so that the surface density becomes from 20 to 2,000 g/m$^2$, which has a maximum pore size of from 0.1 to 500 $\mu$m, is also used preferably as the porous anion exchanger layer of the present invention. As this porous ion exchanger layer, preferred is a non-woven fabric having a thickness of from 100 $\mu$m to 10 mm.

The porous anion exchanger layer may be disposed on the anode side of each anion exchange membrane when the EDI apparatus is assembled, or the porous anion exchanger layer and the anion exchange membrane may preliminarily be laminated one on the other and combined. Particularly when the porous anion exchanger layer is thin, it is preferred to laminate one on the other in view of handling. The anion exchange membrane having a porous anion exchanger layer on the anode side thus formed or combined, may be used for demineralizing and concentrating processes utilizing its properties, and it is particularly useful for an electro-regenerating type apparatus for producing deionized water (EDI apparatus).

A common constitution of the EDI apparatus is as follows. Namely, a plurality of cation exchange membranes and anion exchange membranes are alternately arranged between an anode compartment provided with an anode and a cathode compartment provided with a cathode, to alternately dispose a level of from 2 to 300 sets of demineralizing compartments and concentrating compartments in series, each of the demineralizing compartments being compartmentalized with the anion exchange membrane on the anode side and compartmentalized with the cation exchange membrane on the cathode side, and each of the concentrating compartments being compartmentalized with the cation exchange membrane on the anode side and compartmentalized with the anion exchange membrane on the cathode side.

Demineralization is carried out by applying an electric current while passing water to be treated through the demineralizing compartments and passing water through the concentrating compartments to exclude concentrated salts. It is possible to apply to each unit cell a level of from 2 to 10 V of voltage at which dissociation of water is caused in the demineralizing compartments., By disposing the porous anion exchanger layer of the present invention on the anode side of each anion exchange membrane in the above EDI apparatus, deionized water can be obtained stably.

The method for producing deionized water of the present invention is suitable for demineralization of water to be treated having an electrical conductance of from 1 to 500 $\mu$S/cm and having from 10 to 5,000 ppb of hardness components as calculated as calcium carbonate when supplied to the demineralizing compartments.

As the ion exchanger to be packed into the demineralizing compartments of the EDI apparatus of the present invention, various ion exchangers may be used without limitations, and examples of which include a mixture of an anion exchange resin and a cation exchange resin, a layered structure in which a plurality of anion exchange resin layers and cation exchange resin layers are alternately piled up in a flow direction of the water to be treated, and a packed product in a mosaic pattern or a lattice pattern of an anion exchange resin layer and a cation exchange resin layer, or in a sea-island pattern of one continuous ion exchange resin layer dotted with the other ion exchange resin layer. Further, the ion exchanger may be in a form of particles or in other forms such as a mixture of ion exchange fibers and an ion exchange resin, a mixture of anion exchange fibers and cation exchange fibers, a composite of an ion exchanger and an electroconductive material, and a sheet-like ion exchanger having an anion exchange resin and a cation exchange resin formed into a sheet by a binding agent.

Now, the present invention will be explained in further detail with reference to Examples. However, it should be understood that the present invention is by no means restricted to such specific Examples.

PRODUCTION EXAMPLE 1

Example for Producing a Multi-layer Anion Exchange Membrane

Firstly, an anion exchange membrane was prepared as follows. A binder made of a mixture obtained by mixing and kneading 70 mass % of a low-density polyethylene and 30 mass % of an ethylene-propylene-diene rubber by a Laboplast mil kneader (manufactured by Toyo Seiki Seisakusho) at 150° C. for 30 minutes, and a dried pulverized product (average particle size: 50 $\mu$m ) of a strong-basic anion exchange resin (Diaion SA-10A, manufactured by Mitsubishi Chemical Corporation), were mixed with a mixture ratio of 40/60 (ratio in mass) and kneaded by the Laboplast mil at 130° C. at 50 rpm for 20 minutes. The obtained kneaded product was subjected to melt pressing under heating by a flat press at 1600° C., to obtain an anion exchange membrane 1 having a thickness of 500 $\mu$m.

Then, a porous anion exchanger layer 1 to be combined with the anion exchange membrane was prepared as follows. The above binder polymer and a dried pulverized product (average particle size: 50 $\mu$m ) of a porous type strong-basic anion exchange resin (Diaion PA316, manufactured by Mitsubishi Chemical Corporation) were mixed with a mixture ratio of 5/95 (ratio in mass) and kneaded by the Laboplast mil at 130° C. at 50 rpm for 20 minutes, and the kneaded product thus obtained was subjected to melt pressing under heating by a flat press at 160° C. to obtain a porous anion exchanger layer 1 having a porosity of 45% and a thickness of 300 $\mu$m. The maximum pore size of the porous anion exchanger layer 1 was 50 $\mu$m from the bubble point in an aqueous medium. The anion exchange membrane 1 and the porous anion exchanger layer 1 thus obtained were press-bonded at 1400° C. to obtain a multi-layer anion exchange membrane 1 having a thickness of 780 $\mu$m.

PRODUCTION EXAMPLE 2

Example for Producing a Multi-layer Anion Exchange Membrane

A porous anion exchanger layer 2 was prepared as follows. A microporous membrane made of polytetrafluoroethylene having a porosity of 90%, a maximum pore size of 1 $\mu$m and a thickness of 150 $\mu$m, was irradiated with 200 kGy of radiation from Co60, dipped in a hexane solution of 2 mass % of chloromethylstyrene and 0.08 mass % of Niper BO (manufactured by NOF Corporation) as a polymerization initiator, and heated to 600° C. for 16 hours. The obtained membrane was dried, whereupon the increasing rate of mass was 10%. Then, the membrane was dipped in a methyl alcohol solution of trimethylamine to introduced anion exchange groups to obtain a porous anion exchanger layer 2 having a porosity of 85% and a thickness of 150 $\mu$m. The maximum pore size of the porous anion exchanger layer 2 was 0.9 $\mu$m from the bubble point in an isopropyl alcohol medium. The porous anion exchanger layer 2 thus obtained and the anion exchange membrane 1 prepared in Production Example 1 were press-bonded at 1400° C. to obtain a multi-layer anion exchange membrane 2 having a thickness of 640 $\mu$m.

PRODUCTION EXAMPLE 3

Example for Producing an Anion Exchanger Layer

A porous anion exchanger layer 3 was prepared as follows. A non-woven fabric of 500 g/m², made of polypropylene fibers having an average size (average thickness) of 40 $\mu$m, was irradiated with 200 kGy of radiation from Co60, and dipped in chloromethylstyrene to conduct graft polymerization at a temperature of 60° C. for 16 hours to obtain a polymerized product having a graft percentage of 110%. This polymerized product was dipped in a methyl alcohol solution of trimethylamine to introduce anion exchange groups, to obtain a porous anion exchanger layer 3 having a porosity of 55% and a thickness of 2 mm. The maximum pore size of the porous anion exchanger layer 3 was 40 μm from the bubble point in an aqueous medium.

PRODUCTION EXAMPLE 4

Example for Producing a Cation Exchange Membrane

As a cation exchange membrane to be a counterpart of the anion exchange membrane, a cation exchange membrane 1 having a thickness of 500 μm was obtained in the same manner as the cation exchange membrane 1 of Production Example 1 except that a strong-acid cation exchange resin (Diaion SK-1B, manufactured by Mitsubishi Chemical Corporation) was used.

PRODUCTION EXAMPLE 5

Example for Producing an Anion Exchanger Layer

A porous anion exchanger layer 4 was prepared as follows. 100 parts by mass of a quarternary ammonium salt type anion exchange resin (Diaion SA-10A, tradename, manufactured by Mitsubishi Chemical Corporation) having a particle size of from 400 to 600 μm and 3 parts by mass of an ethylene-propylene rubber were mixed at 150° C. for 30 minutes, and the mixture thus obtained was pressed by a flat press to obtain a porous anion exchanger layer having a thickness of 6 mm, a porosity of 45% and a maximum pore size of 220 m.

EXAMPLE 1

An electrodialyzer (effective area 507 cm² [width (=compartment frame width) 13 cm, length (=demineralizing compartment length) 39 cm]×3 pairs) comprising a filter press type dialyzer (a polypropylene-made net is inserted into a concentrating compartment) having the above cation exchange membrane 1 and the multi-layer anion exchange membrane 1 having the porous anion exchanger layer 1 prepared in Production Example 1 arranged so that the porous anion exchanger layer 1 faced the anode side and fixed by way of a demineralizing compartment frame (made of polypropylene) and a concentrating compartment frame (made of polypropylene) was formed.

A demineralizing compartment was packed with a sheet-like molded product of a mixture of a cation exchange resin, an anion exchange resin and a binder in a dry state, and a spacer made of a synthetic resin was placed in a concentrating compartment to secure a flowing path. The above two ion exchange resins employed were a sulfonic acid type (H type) cation exchange resin (Diaion SK-1B, tradename, manufactured by Mitsubishi Chemical Corporation) having a particle size of from 400 to 600 μm and an ion exchange capacity of 4.5 meq/g dry resin and a quarternary ammonium salt type (OH type) anion exchange resin (Diaion SA-10A, tradename, manufactured by Mitsubishi Chemical Corporation) having a particle size of from 400 to 600 μm and an ion exchange capacity of 3.5 meq/g dry resin, and they were packed so that the ion exchange capacity ratio was made 50/50.

Then, using this EDI apparatus, operation was continuously carried out for 1,000 hours under conditions as identified in Table 2 by applying a voltage while supplying water to be treated as identified in Table 1, obtained by subjecting industrial water to filtration to remove sand and to a treatment by a reverse osmosis apparatus in one step, to the demineralizing compartments, to examine change in voltage and stability of the resistivity of the water to be treated. The obtained results are shown in Tables 2 and 3. Here, the flow amount in Table 2 is a flow amount per one compartment.

TABLE 1

|  | Water to be supplied to demineralizing compartments |
|---|---|
| Electric conductivity (μS/cm) | 10 |
| pH | 5.6 |
| Silica (μg/L) | 600 |
| Hardness component (mg/L as $CaCO_3$) | 0.2 |

EXAMPLE 2

A deionization test was carried out in the same manner as in Example 1 except that the multi-layer anion exchange membrane 2 obtained in Production Example 2 was used instead of the multi-layer anion exchange membrane 1 having the porous anion exchanger layer 1 of Example 1, and the obtained results are shown in Tables 2 and 3.

EXAMPLE 3

A deionization test was carried out in the same manner as in Example 1 except that the porous anion exchanger layer 3 obtained in Production Example 3 and the anion exchange membrane 2 prepared in Production Example 1 were overlaid one on the other and disposed so that the layer 3 was on the anode side and the membrane 2 was on the cathode side, instead of the multi-layer anion exchange membrane 1 having the porous anion exchanger layer 1 of Example 1, and the obtained results are shown in Tables 2 and 3.

EXAMPLE 4

A deionization test was carried out in the same manner as in Example 3 except that the porous anion exchanger layer 4 obtained in Production Example 5 was used instead of the porous anion exchanger layer 3 of Example 3, and the obtained results are shown in Tables 2 and 3.

COMPARATIVE EXAMPLE 1

A deionization test was carried out in the same manner as in Example 1 except that the anion exchange membrane 1 prepared in Production Example 1 was used instead of the multi-layer anion exchange membrane 1 having the porous anion exchanger layer 1 of Example 1. The obtained results are shown in Tables 2 and 3.

COMPARATIVE EXAMPLE 2

A deionization test was carried out in the same manner as in Example 1 except that the porous anion exchanger layer of the multi-layer anion exchange membrane 1 in Example 1 was disposed on the cathode side instead of the anode side, and the obtained results are shown in Tables 2 and 3.

TABLE 2

|  | Ex. 1 | Ex. 2 | Ex. 3 | Ex. 4 | Comp. Ex. 1 | Comp. Ex. 2 |
|---|---|---|---|---|---|---|
| Flow amount of water to | 90 | 90 | 90 | 90 | 90 | 90 |

TABLE 2-continued

|  | Ex. 1 | Ex. 2 | Ex. 3 | Ex. 4 | Comp. Ex. 1 | Comp. Ex. 2 |
|---|---|---|---|---|---|---|
| be treated (L/h) |  |  |  |  |  |  |
| Recycled flow amount of concentrating water (L/h) | 32 | 32 | 32 | 32 | 32 | 32 |
| Current density (A/dm$^2$) | 0.2 | 0.2 | 0.2 | 0.2 | 0.2 | 0.2 |
| Recovery rate of water to be treated (%) | 90 | 90 | 90 | 90 | 90 | 90 |

TABLE 3

|  | Ex. 1 | Ex. 2 | Ex. 3 | Ex. 4 | Comp. Ex. 1 | Comp. Ex. 2 |
|---|---|---|---|---|---|---|
| Initial |  |  |  |  |  |  |
| Voltage (V/pair) | 3.6 | 3.5 | 3.8 | 4.0 | 4.0 | 3.5 |
| Resistivity (MΩ/cm) | 17 | 17 | 17 | 17 | 17 | 17 |
| After 1,000 hrs. |  |  |  |  |  |  |
| Voltage (V/pair) | 3.6 | 3.5 | 3.8 | 4.1 | 12 | 10 |
| Resistivity (MΩ/cm) | 17 | 17 | 16 | 16 | 2 | 2 |

As evident from Tables 2 and 3 showing the results of these tests, in the present invention, by disposing a porous anion exchanger layer on the anode side of each anion exchange membrane, there is no increase in voltage of an EDI apparatus even after a long-term operation of said apparatus, and the produced deionized water has a high resistivity and is stable.

According to the present invention, by disposing a porous anion exchanger layer on the anode side of each anion exchange membrane of an EDI apparatus, deposition and accumulation of hardness components on the concentrating compartment side of anion exchange membranes can be suppressed, whereby increase in voltage can be avoided even when the EDI apparatus is operated for a long period of time, and the produced deionized water has no decrease in resistivity. Accordingly, the present invention has prominent effects.

The entire disclosure of Japanese Patent Application No. 11-351946 filed on Dec. 10, 1999 including specification, claims and summary are incorporated herein by reference in its entirety.

What is claimed is:

1. An electro-regenerating type apparatus for producing deionized water, which comprises an electrodialyzer having cation exchange membranes and anion exchange membranes alternately arranged between an anode compartment provided with an anode and a cathode compartment provided with a cathode, demineralizing compartments compartmentalized with the anion exchange membranes on the anode side and compartmentalized with the cation exchange membranes on the cathode side, and concentrating compartments compartmentalized with the cation exchange membranes on the anode side and compartmentalized with the anion exchange membranes on the cathode side, the electrodialyzer having ion exchangers accommodated in the demineralizing compartments, wherein a porous anion exchanger layer having a porosity of from 20 to 95%, a maximum pore size of from 0.01 to 500 μm and a thickness of at least five times the maximum pore size and from 10 μm to 10 mm, is provided on the anode side of each anion exchange membrane.

2. The apparatus for producing deionized water according to claim 1, wherein the porous anion exchanger layer provided on the anode side of each anion exchange membrane is a microporous membrane having a maximum pore size of from 0.01 to 10 μm and having anion exchange functional groups.

3. The apparatus for producing deionized water according to claim 2, wherein the porous anion exchanger layer provided on the anode side of each anion exchange membrane is combined with the anion exchange membrane to form a multi-layer structure.

4. The apparatus for producing deionized water according to claim 1, wherein the porous anion exchanger layer provided on the anode side of each anion exchange membrane is a molded product which comprises 100 parts by mass of an anion exchange resin having a particle size of from 1 μm to 1,000 μm and from 1 to 20 parts by mass of a binder, and which has a maximum pore size of from 0.5 to 500 μm.

5. The apparatus for producing deionized water according to claim 4, wherein the porous anion exchanger layer provided on the anode side of each anion exchange membrane is combined with the anion exchange membrane to form a multi-layer structure.

6. The apparatus for producing deionized water according to claim 1, wherein the porous anion exchanger layer provided on the anode side of each anion exchange membrane is an aggregate of anion exchange fibers having an average size of from 1 to 100 μm accumulated so that the surface density becomes from 20 to 2,000 g/m, which has a maximum pore size of from 0.1 to 200 μm.

7. The apparatus for producing deionized water according to claim 6, wherein the porous anion exchanger layer provided on the anode side of each anion exchange membrane is integrated with the anion exchange membrane to form a multi-layer structure.

8. The apparatus for producing deionized water according to claim 1, wherein the porous anion exchanger layer provided on the anode side of each anion exchange membrane is combined with the anion exchange membrane to form a multi-layer structure.

9. An electro-regenerating type apparatus for producing deionized water as claimed in claim 1, wherein the porosity of said porous anion exchanger layer is from 30 to 85%.

10. An electro-regenerating type apparatus for producing deionized water as claimed in claim 1, wherein the maximum pore size of said porous anion exchanger layer is from 0.1 to 300 μm.

11. An electro-regenerating type apparatus for producing deionized water as claimed in claim 1, wherein the thickness of said porous anion exchanger layer is from 10 to 500 times said maximum pore size.

12. An electro-regenerating type apparatus for producing deionized water as claimed in claim 1, wherein the thickness of said porous anion exchanger layer is from 20 to 100 times said maximum pore size.

13. An electro-regenerating type apparatus for producing deionized water as claimed in claim 1, wherein the thickness of said porous anion exchanger layer is from 20 μm to 8 mm.

14. An electro-regenerating type apparatus for producing deionized water as claimed in claim 1, wherein the thickness of said porous anion exchanger layer is from 40 μm to 5 mm.

15. A method for producing deionized water by electro-regenerating deionization, which comprises (i) using an apparatus for producing deionized water comprising an electrodialyzer having cation exchange membranes and anion exchange membranes alternately arranged between an anode compartment provided with an anode and a cathode compartment provided with a cathode, demineralizing compartments compartmentalized with the anion exchange membranes on the anode side and compartmentalized with the cation exchange membranes on the cathode side, and concentrating compartments compartmentalized with the cation exchange membranes on the anode side and compartmentalized with the anion exchange membranes on the cathode side, the electrodialyzer having ion exchangers accommodated in the demineralizing compartments, and (ii) applying a voltage while supplying water to be treated to the demineralizing compartments to remove impurity ions in the water to be treated, wherein a porous anion exchanger layer having a porosity of from 20 to 95%, a maximum pore size of from 0.01 to 500 µm and having a thickness of at least five times the maximum pore size and from 10 µm to 10 mm, is provided on the anode side of each anion exchange membrane.

16. The method for producing deionized water by electro-regenerating deionization according to claim 15, wherein the water to be treated has an electrical conductance of from 1 to 500 µS/cm and has from 10 to 5,000 ppb of hardness components as calculated as calcium carbonate.

* * * * *